United States Patent [19]
McCaskill et al.

[11] Patent Number: 4,481,603
[45] Date of Patent: Nov. 6, 1984

[54] FILE PROCESSING METHOD USING EXPANDING DISPLAY WINDOWS FOR SELECTED RECORDS AND TEXT FIELDS

[75] Inventors: Rex A. McCaskill; John W. McInroy; Paul D. Waldo, all of Austin, Tex.

[73] Assignee: International Business Machines Corporation, Armonk, N.Y.

[21] Appl. No.: 264,625

[22] Filed: May 18, 1981

[51] Int. Cl.[3] .......................... G06F 3/14; G06F 7/22

[52] U.S. Cl. .................................. 364/900; 340/721; 340/799; 400/63; 400/83

[58] Field of Search ... 364/200 MS File, 900 MS File, 364/300; 400/63, 83; 340/721, 711, 799

[56] References Cited

U.S. PATENT DOCUMENTS

| | | | |
|---|---|---|---|
| 3,566,361 | 2/1971 | Lavertu et al. . | |
| 3,757,037 | 9/1973 | Bialek | 340/712 |
| 3,872,460 | 3/1975 | Fredrickson et al. | 340/711 |
| 4,057,849 | 11/1977 | Ying et al. | 364/200 |
| 4,129,858 | 12/1978 | Hara . | |
| 4,193,112 | 3/1980 | Gilbert et al. | 364/200 |
| 4,197,590 | 4/1980 | Sukonick et al. | 364/900 |
| 4,204,206 | 5/1980 | Bakula et al. | 340/721 |
| 4,298,957 | 11/1981 | Duvall et al. | 364/900 |
| 4,329,684 | 5/1982 | Monteath et al. | 340/707 |
| 4,417,239 | 11/1983 | Demke et al. | 340/709 |
| 4,425,629 | 1/1984 | Cason et al. | 364/900 |

FOREIGN PATENT DOCUMENTS

| | | | |
|---|---|---|---|
| WO82/00726 | 3/1982 | PCT Int'l. Appl. | 340/721 |

OTHER PUBLICATIONS

*Windowed Editor,* Datamation (Feb. 1982), p. 198.

*The Electric Blackboard,* Datamation (Feb. 1982), Advertisement.

W. D. Elliot et al., Computer Assisted Tracing of Text Evolution, (A.F.I.P.S. Conference Proceedings, vol. 39, Nov. 1971) pp. 533-540.

*Primary Examiner*—Raulfe B. Zache
*Assistant Examiner*—A. E. Williams, Jr.
*Attorney, Agent, or Firm*—Harold E. Meier

[57] ABSTRACT

An information processing system (10) has a terminal (12) which functions with a diskette storage (14). The terminal (12) includes a display screen (16) and keyboard (18) wherein an operator enters alphanumeric characters and predefined commands. A file of information is stored on the diskette storage (14). The file is made up of a plurality of records. Each of the records comprises a plurality of fields. The fields include character fields, arithmetic fields and text fields. The text fields include alphanumeric, punctuation and control characters, the character fields include alphanumeric and punctuation characters and exclude control characters and the arithmetic fields include numeric characters and exclude control characters. By inputting commands to the keyboard (18) the operator reads a record from storage (14) and displays it on the screen (16). The content of the fields in the record are displayed on the screen (16) except for the text fields. For each text field there is displayed an asterisk (60). The operator selects a text field by positioning a cursor (62) beneath the corresponding asterisk and then inputting a down cursor command. In response to the down cursor command the terminal (12) opens a text window on the screen (16) and displays the corresponding text field on the lower portion (**16*b*) of the screen (16). The operator is then free to edit the text field. After completion of the editing the operator enters a command to incorporate the edited text field with the selected record. The record with the edited text field can then be returned to the file in the storage (14**).

8 Claims, 4 Drawing Figures

FILE PROCESSING METHOD USING EXPANDING DISPLAY WINDOWS FOR SELECTED RECORDS AND TEXT FIELDS

BACKGROUND OF THE INVENTION

1. Field of the Invention

The present invention pertains to word and data base processing in general and more specifically to the processing of information which has a plurality of defined fields which include a character field, an arithmetic field and a text field.

2. Description of the Prior Art

Numerous word processing systems have been developed for the editing and manipulation of conventional alphanumeric text. Data base systems have also been developed to store quantities of information and perform various operations on this stored information such as sorting and qualifying stored records. The data base systems can be used to automatically operate on a large number of records without the operator having to call up each record individually. There are numerous applications wherein information must be handled for both editing as with conventional word processing and sorting as carried out with data base systems. However, it has been found that the display and manipulation of information for word processing applications is not readily compatible with the display and processing of information for data base applications. In view of this problem there exists a need for a method of processing information through the use of a display screen and keyboard such that the information is displayed and manipulated in such a manner that both word processing editing and data base sorting and qualification can be carried out for a system having a large number of records in a file.

SUMMARY OF THE INVENTION

There is disclosed herein a method for processing information through the use of a display screen and a keyboard for efficient handling of conventional text editing together with data base operations. A file of information is maintained in a memory store wherein the file comprises a plurality of records and each record comprises a plurality of fields. The fields comprise character fields which include alphanumeric characters but exclude control characters, arithmetic fields which include numeric characters and exclude control characters and text fields which include both alphanumeric and control characters. In response to a command entered through the keyboard one of the records is selected from the main store. The selected record is displayed on the display screen wherein a predetermined character, such as an asterisk, is displayed for each of the text fields in place of the characters making up each of the text fields in the displayed record. One of the predetermined characters in the displayed record is identified in response to a command entered through the keyboard. In response to the identification of one of the predetermined characters there is displayed on the display screen the text field corresponding to the identified predetermined character. The information in the displayed text field is then edited in response to commands received through the keyboard. The edited text field is then incorporated into the record which was read from the main store to produce an edited record. Finally the edited record is stored in the main store or printed.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION

Figure 1:
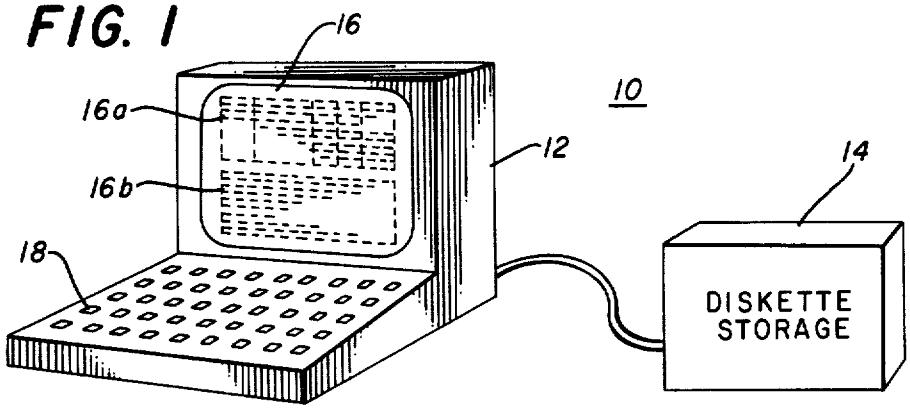
FIG. 1 is a perspective view illustrating a work station made up of a CRT display screen and a keyboard with the station connected to a main store consisting of a diskette storage unit.

Referring now to FIG. 1 there is illustrated an information processing system 10 which comprises a work station 12 connected to a main store which in this system is a diskette storage 14. The station 12 includes a display screen 16, which is typically a CRT. Station 12 further includes a keyboard 18 which has keys for entering alphanumeric characters as well as predefined commands.

In operation the operator enters commands through the keyboard 18 to call up information which is stored as files in the diskette storage 14. An operator command may consist of one or more keystrokes. The information which is called up is displayed on screen 16 so that the operator can edit the displayed information to accomplish such tasks as entering new information, revising information, moving information from one location to another and deleting stored information. The operator further has the capability to manipulate the stored information to perform sorting and qualification operations to select or modify the plurality of records stored in the files in diskette storage 14. Thus, the operator has the capability of carrying out conventional word processing editing together with data base manipulations. In a selected step of the operation of the present invention there is displayed on the screen 16 a record 16*a* and a text field 16*b*.

After the operator has carried out the desired processing of the stored records these modified records can then be returned to be stored in the appropriate file in the diskette storage 14. Through equipment not shown the edited records can also be printed or transmitted to other information processing systems.

Figure 2:
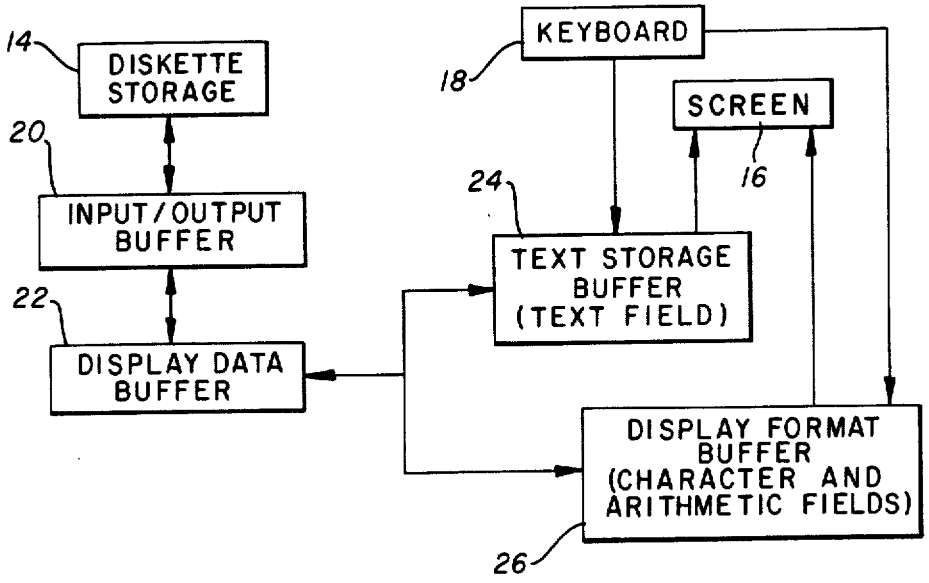
FIG. 2 is a block diagram of functional units for the system illustrated in FIG. 1.

Referring to FIG. 2 there is illustrated a functional block diagram on the operational elements of the present invention. The information flow is described as follows. An information file is stored in the diskette storage 14. The file is made up of a plurality of records. Each record comprises a plurality of fields. The fields include character fields, arithmetic fields and text fields. A character field is defined as a group of primarily alphanumeric and punctuation characters and specifically excludes control characters. The arithmetic field is defined as a field having numeric and limited punctuation characters and further including limited algebraic characters for illustrating mathematical relationships. The arithmetic field does not include control characters. The text field is essentially the same as a character field but includes control characters. Control characters are utilized by the system 10 to indicate the nature and location of characters on the display screen 16. Typical control characters are carrier returns and tabs.

The operator enters a command into the work station 12 which causes a record to be read from the storage 14. This record is transmitted to an input/output buffer 20 where it is temporarily stored. The record in buffer 20 is then transmitted to a display data buffer 22. The record in buffer 22 is transferred to a text storage buffer 24 and a display format buffer 26. The text field of a record is stored in text storage buffer 24. The arithmetic and character fields are stored in buffer 26. The screen 16 displays the information stored in buffers 24 and 26. The displayed record is edited by the operator entering commands and characters through keyboard 18 to alter the fields stored in buffers 24 and 26. After editing is completed the text field in buffer 24 is returned to the record in the display data buffer 22 and incorporated therein. The edited fields in buffer 26 are likewise returned to buffer 22 and incorporated into the record therein. This produces an edited record which the operator can then cause to be transferred into the input/output buffer 20 for storage in the diskette storage 14.

Figure 3:
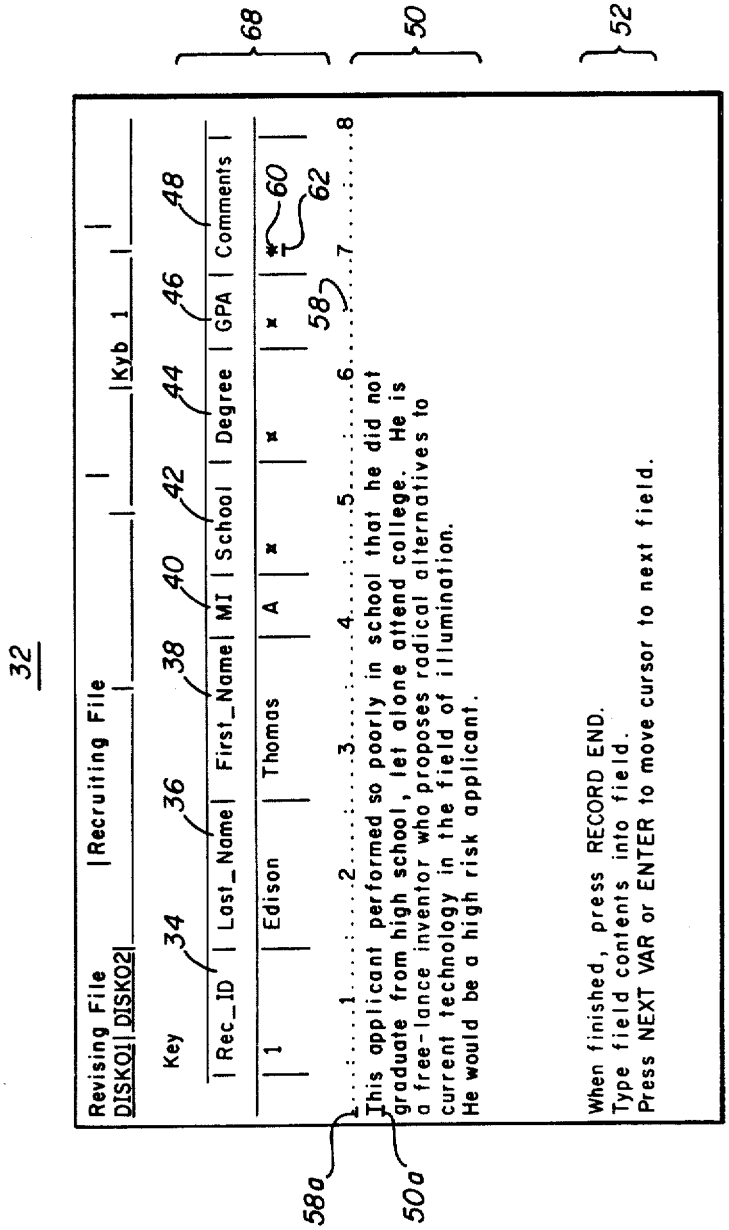
FIG. 3 is an example of a record and a text field as it is displayed on the screen of the station shown in FIG. 1.

A sample display 32 as is shown on screen 16 is illustrated in FIG. 3. The sample display 32 is illustrative of a recruiting file which is made up of a plurality of records wherein each record comprises the relevant data associated with a given individual. The display 32 is made up a plurality of fields. These include a record identification field 34, a last name field 36, a first name field 38, a middle initial field 40, a school field 42, a degree field 44, a grade point average field 46 and a comments field 48. In this example fields 36, 38, 40, 42, and 44 are character fields as defined above and field 48 is a text field as defined above. Fields 34 and 46 are arithmetic fields. The text information for field 48 is located as shown by bracket 50.

A group of operator instructions are included at the location indicated by bracket 52.

A scale line 58 separates the record fields 34–48 from the text indicated by bracket 50. The scale line 58 includes a cursor 58*a* which is located along the scale line to indicate the position of a cursor 50*a* which is positioned in the text field located by bracket 50.

Note that in the comments field 48 there is located an asterisk 60 and a cursor 62 which is at the location of the asterisk 60.

Figure 4:
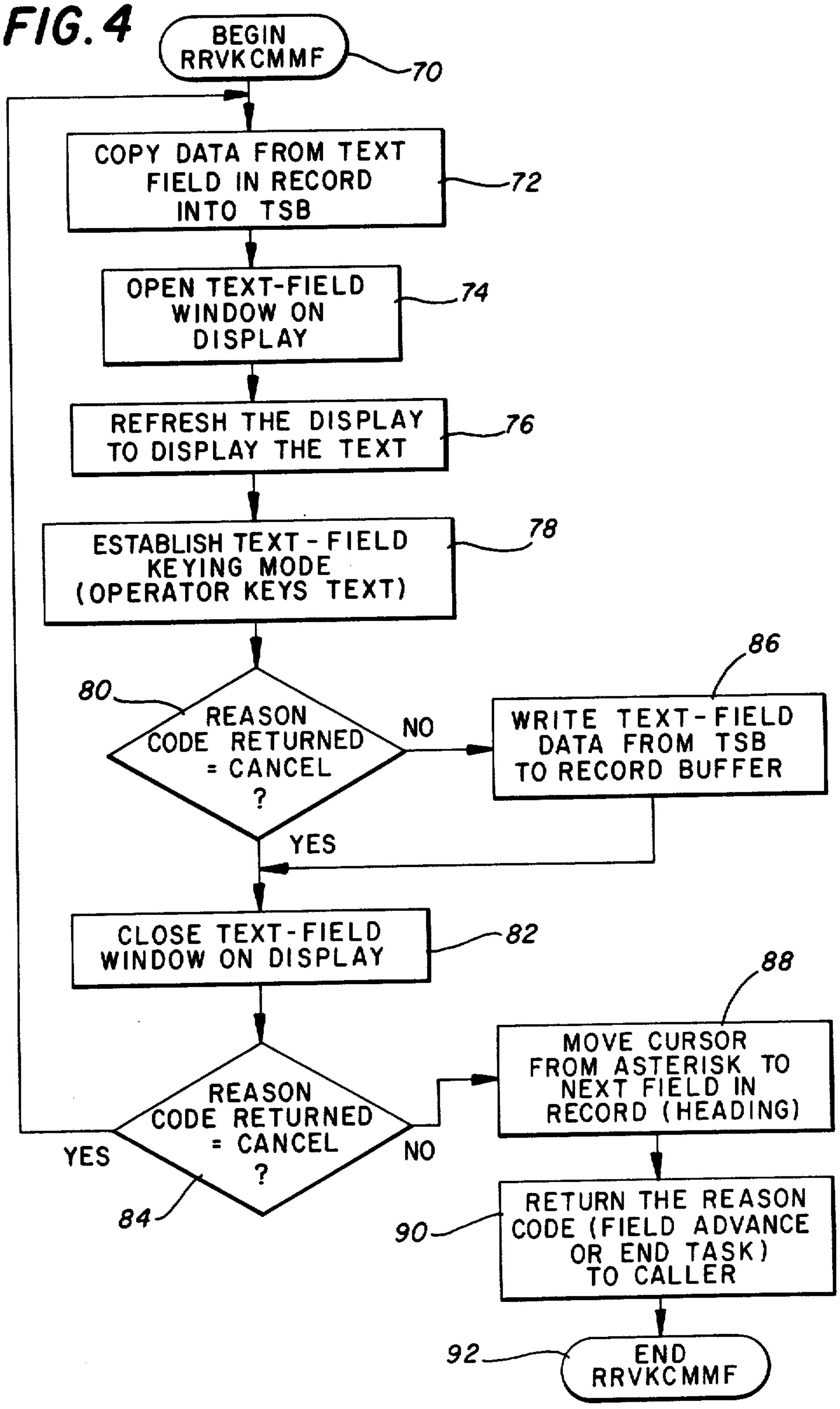
FIG. 4 is a logical flow chart showing the sequence of operation for carrying out the method of the present invention.

The sequence of operation of the present invention is illustrated by the logic flow chart shown in FIG. 4. The overall operation of the present invention is now described in reference to FIGS. 1–4. The operation is begun by the operator entering a command to keyboard 18 to initiate the operations involving the present invention and indicated by the term RRVKCMMF. In a first step the operator calls up a selected record from the diskette storage 14 for display on screen 16. This record is transmitted through buffers 20 and 22 to buffers 24 and 26. The portion of the record first displayed is that indicated by bracket 68 in FIG. 3. Note that the information making up the text field is not displayed in the record. For each of the text fields there is displayed a predetermined field format, for example a selected character such as asterisk 60. Optionally, the predetermined format for a text field may be a blank field. The operator manipulates the cursor 62 to select any one of the fields for editing.

A text field is selected by the operator manipulating the cursor 62 to the position of an asterisk in a text field. After the cursor is located at the position of the asterisk the operator enters a cursor down command. This begins the logical sequence of operations illustrated in FIG. 4 and corresponds to the beginning logical element 70. After the cursor down command is received by the work station 12 the data for the selected text field is transferred from the display data buffer 22 into the text storage buffer 24. This is illustrated by the logical element 72. Next, a text field window is opened on the lower portion of the screen 16. This is illustrated as the display portion 16*b*. The opening of the text field window is carried out in logical element 74.

The screen 16 is then refreshed to display the characters of the selected text field in the text field window of the screen 16. This step is shown as the logical element 76.

After the text field has been displayed on screen 16 the work station 12 must be keyed to operate in the appropriate mode for the type of characters in the selected text field. This comprises defining the keys of keyboard 18 for operation with the selected text field. This step is illustrated by the logical element 78.

At this point the operator is free to enter, change, shift or delete the characters in the displayed text field on screen 16 to produce a processed text field. At some time the operator will enter a return from the editing operations. This is indicated be the logical element 80. If the operator has cancelled the editing task the text field window on the display will be closed as indicated by logical element 82. The operator cancellation continues through logical element 84 which returns the operation through the logical elements 72, 74, 76 and 78 to reestablish the original selected record and selected text field on the display screen 16. This cancellation operation serves to eliminate an edited text field and return to the original text field.

Should the return from logical element 78 be due to completion of the editing task rather than cancellation, the transfer from logical element 80 will go to logical element 86. In logical element 86 the edited text field in the text storage buffer 24 is incorporated into the record which is stored in display data buffer 22 to produce a processed record. After this step of incorporation the text field window is closed as indicated by element 82. Since the return is not due to entry of a cancellation command the logical flow goes from element 84 to an element 88. At the stage of element 88 the text field window has been closed and the cursor 62 in the record is moved to the next field where the operator can continue to carry out editing functions. Following logical element 88 the functioning of station 12 is returned to the immediately preceding operation which existed prior to entering logic element 70. This is illustrated by logic element 90. The return typically comprises resuming the editing of other fields. The ending of the logical steps is illustrated by the logical element 92.

Note in FIG. 3 that when a text field has been called up and displayed on screen 16, there will be three cursors on the screen. A cursor 62 will be maintained at the location of the asterisk representing the text field which is displayed in the text field window. A cursor 58*a* will be displayed on the scale line 58 to indicate the location of the next entry in the text field shown by bracket 50. A third cursor 50*a* is located in the text field itself and is initially positioned at the first character in the text field when the text field is first displayed on the screen 16 in the text field window. After the text field is displayed on the screen 16 the operator manipulates the cursor 50*a* to perform editing in the text field.

For the example illustrated in FIG. 3 the record portion shown by bracket 68 is displayed in the upper display screen section 16*a* and the text field shown by bracket 50 is displayed in the lower screen portion 16*b*.

The logical operations described herein can be incorporated with the TEXTPACK 2 and TEXTPACK 3 operating systems for the IBM Corporation DISPLAY WRITER to implement the present invention.

Although one embodiment of the invention has been illustrated in the accompanying Drawings and described in the foregoing Detailed Description, it will be understood that the invention is not limited to the embodiment disclosed, but is capable of numerous rearrangements, modifications and substitutions without departing from the scope of the invention.

What is claimed is:

1. A method for processing a file of information through use of a display screen, a keyboard and a memory store, the file including a plurality of records, each record having a plurality of text fields, comprising the steps of:

reading one of said records from said memory store in response to a command entered through said keyboard;

displaying said record read from said memory store on a first portion of said display screen;

displaying a field symbol in each of said text fields of said record in place of alphanumeric and control characters normally displayed therein;

setting a cursor at a location of one of said field symbols and entering a predetermined command through said keyboard;

opening a text window on a second portion of said display screen in response to said predetermined command;

simultaneously displaying on said second portion of said display screen, the alphanumeric and control characters of the text field corresponding to the field symbol where the cursor is set;

processing the alphanumeric and control characters in said displayed text field in response to commands received through said keyboard to produce a processed text field; and incorporating said processed text field into said record read from said memory store in response to a command received through said keyboard to produce a processed record.

2. The method recited in claim 1 wherein the field symbol displayed on said screen is a selected character.

3. The method recited in claim 2 wherein said selected character is an asterisk.

4. The method recited in claim 1 including the step of setting a cursor at the first character of said text field after said text field is displayed on said display screen.

5. The method recited in claim 1 including the step of maintaining a cursor at the field symbol in said displayed record corresponding to the displayed text field.

6. The method recited in claim 1 including the step of storing said processed record in said memory store.

7. A method for processing information through use of a display screen, a keyboard and a memory store, comprising the steps of:

maintaining in said memory store a file of information comprising a plurality of records, each record comprising a plurality of fields including character fields having alphanumeric characters, arithmetic fields having numeric and algebraic characters and text fields which include both alphanumeric characters and control characters;

reading one of said records from said memory store in response to a command entered through said keyboard;

displaying said record read from said memory store on a first portion of said display screen;

displaying a predetermined character in each of said text fields in place of the alphanumeric and control characters normally displayed therein;

placing a first cursor at the location of a selected one of said predetermined characters in response to a command received from said keyboard;

maintaining said first cursor at the selected predetermined character;

cursor down commanding said first cursor located at said selected predetermined character in response to a command received from said keyboard;

simultaneously displaying on a second portion of said display screen the alphanumeric and control characters in the text field corresponding to said selected predetermined character in response to said step of cursor down commanding;

setting a second cursor at the first character of said text field after said text field is displayed on said display screen;

processing the alphanumeric and control characters in said displayed text field in response to commands received through said keyboard to produce a processed text field;

incorporating said processed text field into said record read from said memory store to produce a processed record; and storing said processed record in said memory store.

8. The method recited in claim 7 wherein said predetermined character displayed on said screen is an asterisk.

* * * * *